Figure 1:
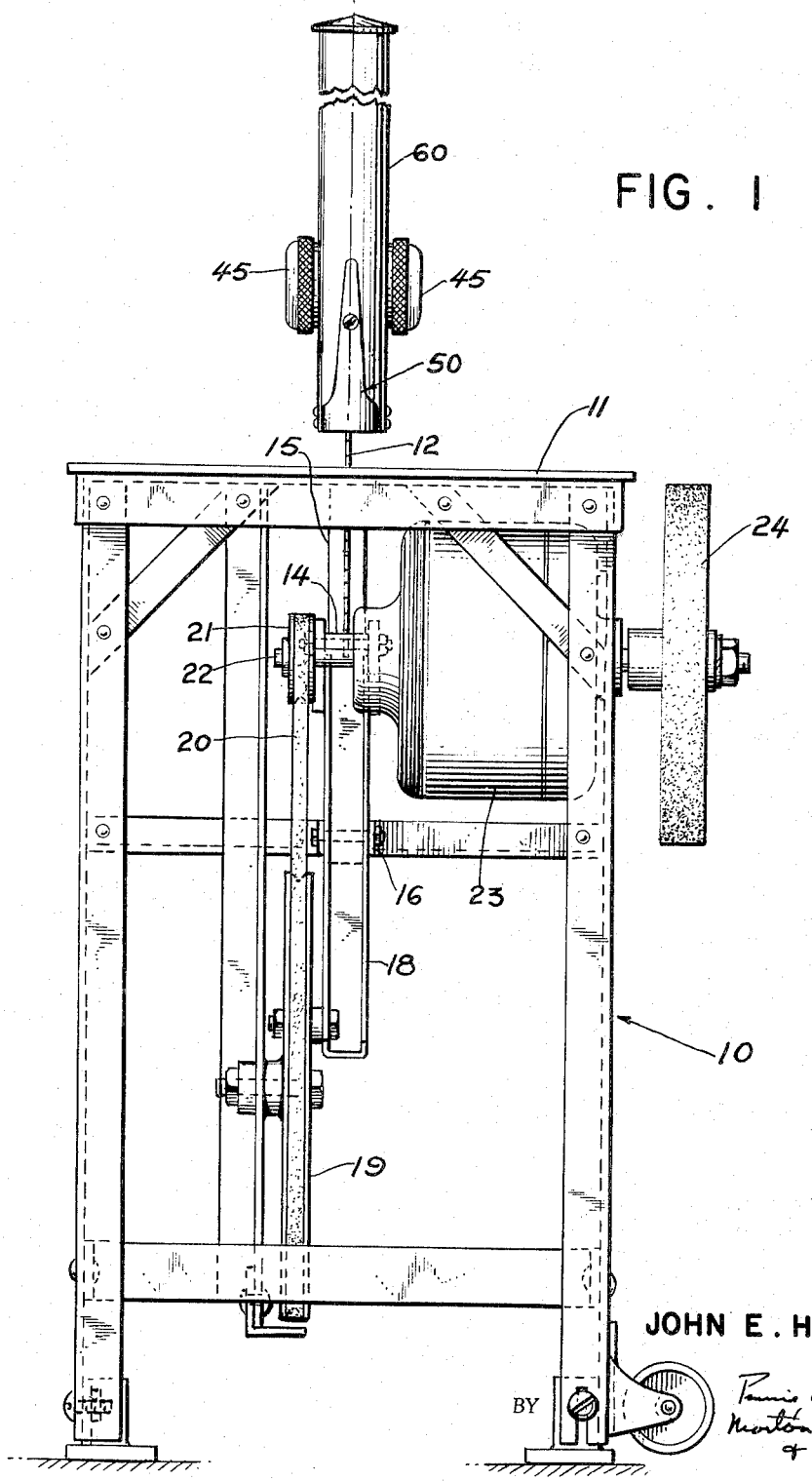

Sept. 25, 1956　　　　J. E. HAYDON　　　　2,764,189
THROATLESS POWER SAW OF RECIPROCATING BLADE TYPE
Filed Sept. 30, 1954　　　　　　　　　　　3 Sheets-Sheet 1

INVENTOR
JOHN E. HAYDON,
BY
ATTORNEYS

Sept. 25, 1956  J. E. HAYDON  2,764,189
THROATLESS POWER SAW OF RECIPROCATING BLADE TYPE
Filed Sept. 30, 1954  3 Sheets-Sheet 2

INVENTOR
JOHN E. HAYDON,
BY
ATTORNEYS

Sept. 25, 1956 J. E. HAYDON 2,764,189
THROATLESS POWER SAW OF RECIPROCATING BLADE TYPE
Filed Sept. 30, 1954 3 Sheets-Sheet 3

INVENTOR
JOHN E. HAYDON,
BY
ATTORNEYS

United States Patent Office 2,764,189
Patented Sept. 25, 1956

2,764,189

THROATLESS POWER SAW OF RECIPROCATING BLADE TYPE

John E. Haydon, Edmonston, Md.

Application September 30, 1954, Serial No. 459,423

11 Claims. (Cl. 143—159)

This invention relates to power saws and particularly to one of the type in which the saw blade is reciprocated for cutting. More especially the invention is concerned with a power saw of the reciprocating blade type which is throatless that is, it can be employed to cut workpieces of unlimted lateral dimension.

Conventional saws of the throatless type are well known, such saws for example being the common rotary buzz saw and the perhaps less common but well known saber saw. The latter, as does the saw of the present invention, involves a reciprocation of the saw blade for cutting. Both rotary or buzz saw blades and saber saw blades are relatively expensive. In the case of the former also, certain materials cannot be satisfactorily cut and the edges of the kerfs formed in workpieces thereby are usually poorly finished and rough. In addition, the end of a cut made by a buzz saw is not square with the surface of the material being cut. Hence corners cannot be cut out clean without running into portions of the workpiece that it may not be desirable to cut. Aside from the cost of saber saw blades, the fact that in use they are supported but at one end severely limits the various types of materials with which they may be employed as well as the speed at which cutting may be accomplished with them.

As indicated previously, my invention is concerned with a throatless saw. It therefore possesses the most important characteristic of buzz or saber type saws. It is free, however, from all of the disadvantages of those two types of saws as outlined above. Thus it can be employed for cutting a wide variety of materials, it can leave a square kerf end, it can operate at high speeds because, as will be explained below, I provide an upper end guide and backup for the blade, and perhaps most important of all it can employ conventional inexpensive hack saw blades. In addition, in my power saw the exposed portion of the blade during cutting, that is, the portion not lying in the kerf of the cut, is carefully protected by an adjustable guard. The problem of guarding buzz saw and saber saw blades is one that has heretofore presented considerable difficulty.

A power saw according to my invention includes a conventional work supporting surface. A guide and guard supporting fin extends upwardly from the work supporting surface. The thickness of the fin is advantageously no greater than and preferably less than the thickness of a kerf to be formed in a workpiece by the saw. A guide for the upper end of a conventional hack saw blade is supported by the fin. The hack saw blade to be employed may be of conventional form and is adapted to extend downwardly from the guide through the work supporting surface to a supporting member mounted therebelow. The supporting member for the lower end of the saw blade is mounted for reciprocation and the power saw includes means for reciprocating the saw support and thereby the saw. A hold-down member for maintaining a workpiece in firm engagement with the work surface during a sawing operation may also advantageously be supported by the fin. This hold-down member may also advantageously take the form of a guard shielding the upper end of a saw blade from contact by the operator. In addition the blade support and the guide for the upper end of the blade are advantageously so located relative to the fin and the fin is of such shape that it provides a backup support for the blade during operation of the saw.

Figure 2:
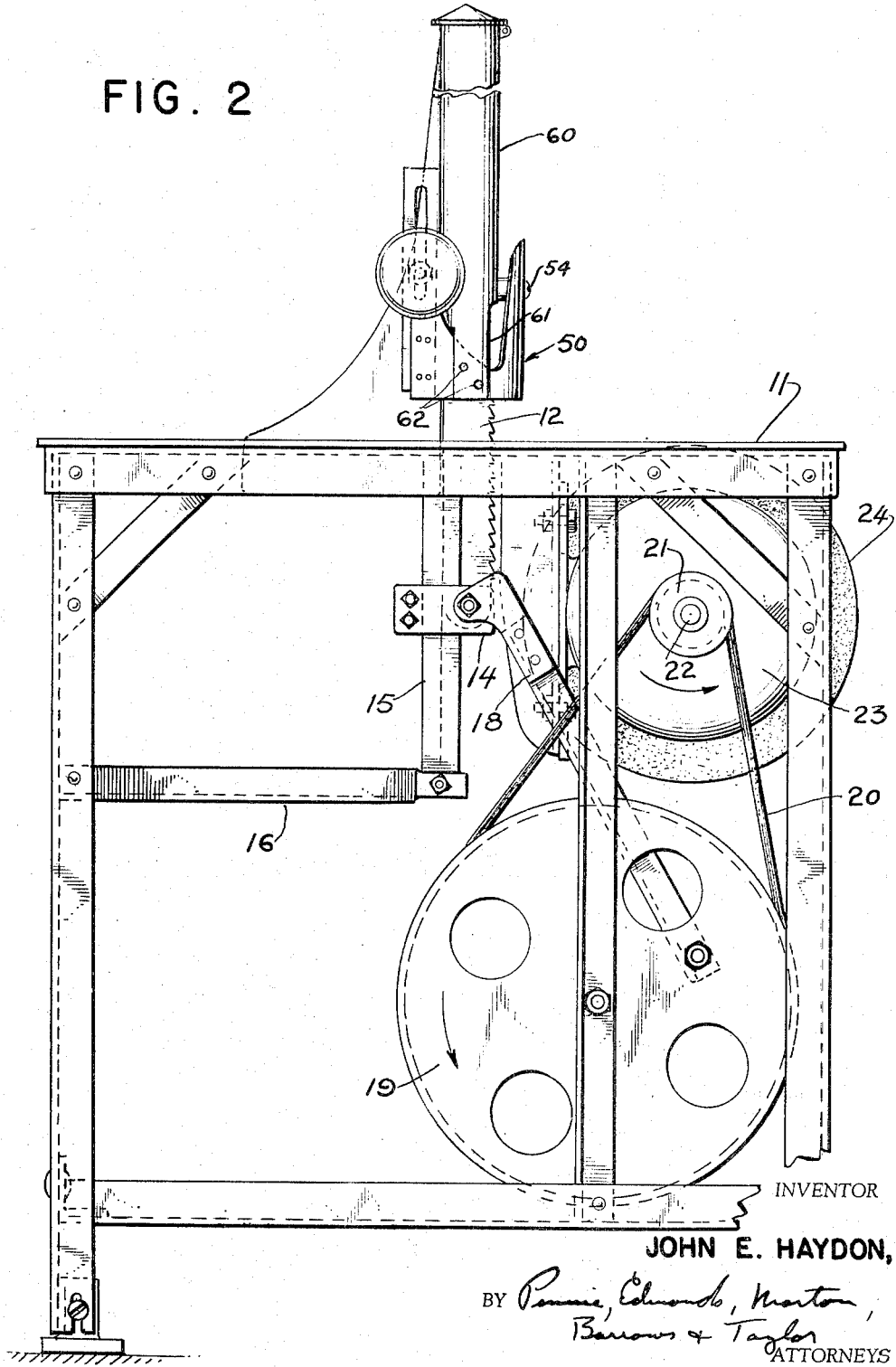
Figure 3:
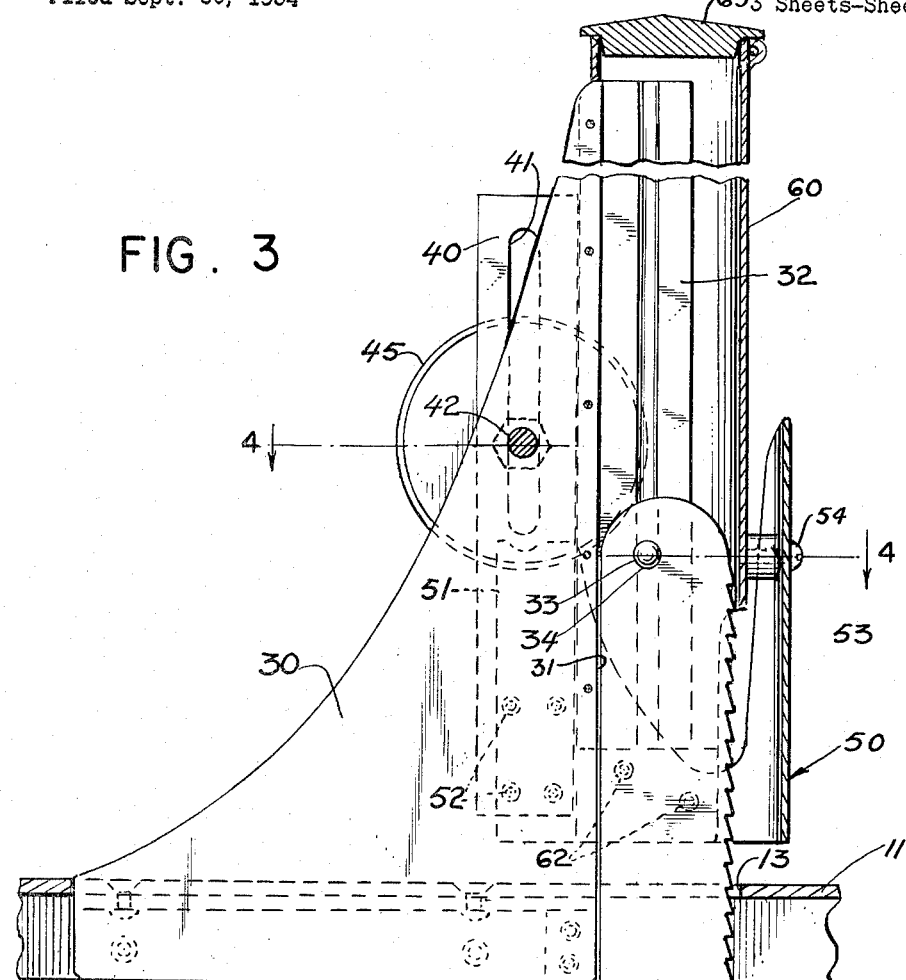

For a more detailed understanding of my invention, reference may be made to the following specific description of one form of saw coming within the scope thereof and to the accompanying drawings, in which:

Fig. 1 is a front elevation of the saw;
Fig. 2 is a side elevation thereof;
Fig. 3 is an enlarged side elevation partly in section of the fin, guide and guard elements; and
Fig. 4 is a sectional view in plan taken along line 4—4 of Fig. 3.

Referring to the drawings, the power saw comprises a suitable supporting framework 10 which supports a flat work supporting surface 11 of substantial area. A conventional hack saw blade 12 extends through an opening 13 (Fig. 3) in work surface 11 and is supported at its lower end beneath the work surface by a support member 14 (Fig. 2) which is reciprocably mounted on a guide 15 which in turn is supported from the framework 10 by a bracket 16. The connection between blade 12 and support member 14, as will be noted in the drawings, makes use of the hole in the end of the blade, this hole being one of those conventionally found in the end of hack saw blades. Support member 14 and hence the saw blade 12 are reciprocated by a connecting rod 18 secured at one end to the support member 14 and at its other end to a drive pulley 19 suitably mounted for rotation in framework 10. Drive pulley 19 is driven by a V-belt 20 extending between it and a pulley 21 mounted on the output shaft 22 of a drive motor 23. On the other end of motor shaft 22 there is mounted a flywheel 24, the function of which is conventional, namely, to maintain the load on the motor nearly uniform. The motor 23 is preferably a variable speed motor, though if desirable it may be a constant speed motor, in which case it will be advantageous to provide a variable speed transmission of one sort or another (not shown) between the output shaft of motor 23 and drive pulley 19. While the direction of rotation of drive pulley is not critical, I have found that for the best and smoothest operation of the saw, it should be rotated in a counterclockwise direction as seen in Fig. 2.

Figure 4:
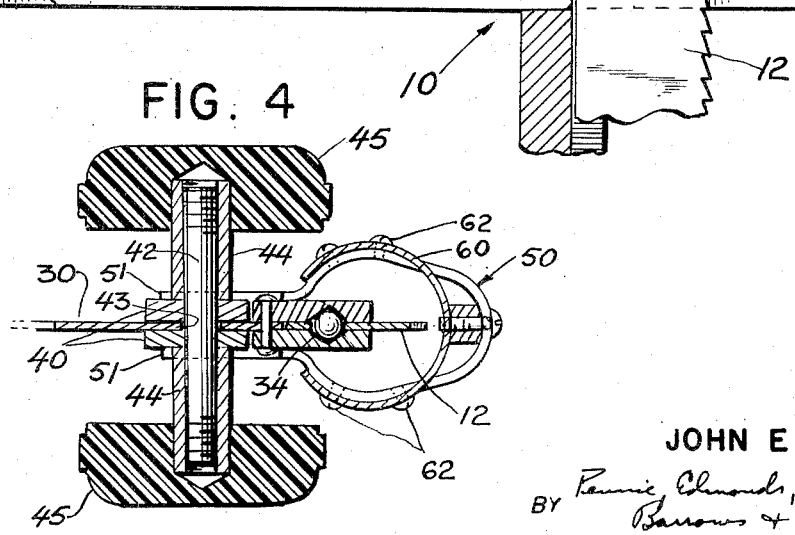

By reference to Figs. 3 and 4 in particular, it can be seen that the power saw includes a thin fin 30 supported from the framework 10 to extend a substantial distance above work supporting surface 11. The fin 30 is provided with a vertically disposed forward edge 31 in close proximity to which the rear edge of saw blade 12 moves during reciprocation. This edge of the fin provides, as heretofore suggested, a backup for the saw blade during use. Hence when a workpiece is urged against the cutting edge of the saw tending to force it rearwardly, it may engage and slide upon edge 31 of the fin.

A pair of guide members 32 are fixedly secured to the fin adjacent its forward edge 31 and extend forwardly thereof. These guide members, only one of which is shown in Fig. 3, are spaced from one another to accommodate movement of the saw blade therebetween and each contains a groove extending longitudinally thereof. The two grooves are adapted to form together a channel for a ball 33 which may be mounted in the conventional opening 34 found in the end of the hack saw blade. During reciprocation of the saw blade 12, therefore, its upper end is firmly guided by guide members 32. A pin might be employed, of course, instead of ball 33, but I find that best results may be achieved with the latter.

During use of my power saw for cutting a workpiece supported on surface 11, it is necessary during the upward stroke of the saw blade to positively hold the work down as it will otherwise be carried upwardly from the work supporting surface. I therefore provide what may be termed hold-down apparatus. As it is also desirable, and for safety reasons essential, that the exposed portion of the saw blade be shielded, I also provide a shield or guard for this purpose. I have found it convenient to combine these two elements.

The hold-down and guard assembly comprises, as may be seen in Figs. 3 and 4, a pair of locking members 40, one on each side of fin 30. Each locking member 40 is provided with an elongated slot 41 adapted to receive therethrough a locking shaft 42 which is mounted in a circular hole 43 in fin 30. Locking shaft 42 is threaded at its opposite ends and upon each carries a collar 44 rotatable thereon by a knurled knob 45. Locking plates 40 are free to move on locking shaft 42 except when urged firmly into engagement with fin 30 by collar members 44. This is accomplished when collars 44 are threaded onto shaft 42 and firmly engage locking members 40. A hold-down member 50 surrounds the saw blade and has rearwardly extending wing sections 51, each of which is secured on one side of fin 30 to a locking member 40 by screws 52. Hold-down member 50 has a planar lower edge parallel to work supporting surface 11. It further has an upstanding forward section 53 by which the portion of the blade 12 which is exposed immediately above a workpiece being cut is shielded from contact by the operator. The shape of upstanding portion 53 and that portion of hold-down member 50 immediately therebehind (to the left as seen in Fig. 3) is such that the operator can, however, peer around it to see the point of engagement of the cutting edge of the saw blade with the work. Furthermore, if desirable, the forward face of portion 53 of the hold-down member might be provided at its lowermost portion with a marker indicating the location of a saw blade therebehind.

A tubular guide enclosing member 60 is supported from hold-down member 50 by having downwardly extending flap-like portions 61, which are adapted to lie outwardly of hold-down member 50, secured thereto by screws or the like 62 (Fig. 2). It is also secured to the upper end of the forward upwardly extending portion 53 by a screw or bolt 54. Guide enclosing member 60 is provided at its upper end with flap closure 63 through which access to the guides 32 may be had for lubrication and other purposes.

Operation of the saw for cutting a given workpiece involves first a release of locking members 40 from a frictional locking engagement with fin 30 by a backing off of collars 44 on shaft 42. The locking plates 40, tubular guide enclosing member 60 and hold-down member 50 may then be raised. The work is then placed on work supporting surface 11 and moved into engagement with the cutting edge of saw blade 12. The assembly of guide tube 60 hold-down member 50 and locking plates 40 is then lowered into engagement with the upper surface of the work and locked in this position by proper turning of locking collars 44 by means of knobs 45. The work is then advanced past the saw blade and past fin 30 which enters the kerf cut in the work by the saw blade.

It will be clear that, as previously stated, the power saw of my invention is throatless, that is, workpieces of any lateral dimension may be cut thereby. It should further be clear from the above description that that portion of the saw blade extending above work supporting surface 11 which is not actually within the work being cut is completely protected by the forward portion 53 of hold-down member 50 and the tubular guide enclosing member 60. In addition, during operation the saw blade 12 is backed up by the forward edge 31 of fin 30 whereby considerable pressure may be imposed on the blade by the work. In passing, it may be recalled that this is one of the chief disadvantages of a jig saw, for in such a saw there is no backup for the blade which is supported merely in tension. Of course one of the most important advantages of my power saw is in its ability to employ conventional hack saw blades which are relatively so inexpensive as heretofore pointed out.

Another advantageous feature of my power saw that has not heretofore been mentioned occurs in its use for cutting materials such as plastics which sometimes exhibit a tendency to weld together behind a cutting blade, that is, the opposite sides of the kerf become molten from the heat generated in the sawing operation and flow together behind the blade. With my saw, of course, this cannot occur, for fin 30 positively separates the opposite faces of a kerf for a substantial distance rearwardly of the saw blade 12.

Various changes and modifications may of course be made in the particular form of power saw illustrated and described herein without departing from the scope of my invention which should be limited only to the extent set forth in the appended claims. For example, though it might perhaps be somewhat more expensive, a power saw might be made in accordance with my invention in which the assembly, including fin 30, guides 32, locking plates 40, hold-down member 50 and tubular member 60 might be mounted for withdrawal into or through work supporting surface 11.

I claim:

1. A power saw of the reciprocating blade type comprising a work supporting surface, a fin extending upwardly therefrom, means free of any part extending above said work supporting surface for supporting said fin, said fin supporting means being the sole support of any kind for said fin and said fin being of a thickness not substantially greater than the width of a kerf to be formed in a workpiece by the saw, a guideway supported above said work supporting surface solely by said fin and adapted to guide the upper end of a saw blade, means below said work supporting surface for supporting the lower end of the saw blade, said saw blade being adapted to pass through the work supporting surface, and means beneath said work supporting surface for moving the blade supporting means in a vertical plane to impart a cutting motion to the saw blade, whereby a workpiece of unlimited lateral extent in any direction may be cut by said saw.

2. A power saw according to claim 1 which includes a guard mounted on and supported solely by the fin to cover substantially any exposed portion of a saw blade above said work supporting surface.

3. A power saw according to claim 1 in which the guideway has a channel therein which extends longitudinally and vertically therethrough, the channel being adapted to receive a guiding element mounted in the upper end of a saw blade.

4. A power saw according to claim 1 which includes a work hold-down member secured to and supported solely by said fin.

5. A power saw according to claim 4 which includes means for adjustably mounting the hold-down member on the fin.

6. A power saw of the reciprocating blade type comprising a work supporting surface, a fin extending upwardly therefrom, said fin being of a thickness less than the width of a kerf to be formed in a workpiece by the saw, a guideway supported on said fin above said work supporting surface and adapted to guide the upper end of a saw blade, said guideway comprising a pair of oppositely disposed guide members one secured to each side of the forward edge of the fin and each having a vertically disposed groove therein which in combination with the groove formed in the other forms a channel adapted to receive a guiding element mounted in the upper end of the saw blade, the upper end of the blade itself being adapted to be received between said guide members, means below said work supporting surface for supporting the lower end of the saw blade, said saw blade being adapted to pass through the work supporting surface, and means for moving the blade supporting means in a vertical plane to impart cutting motion to the saw blade.

7. A power saw according to claim 6 which includes blade guard and work hold-down means mounted on said fin and surrounding said guide members and the upper end of the saw blade.

8. A power saw according to claim 7 in which the blade guard and work hold-down means are mounted on said fin for vertical adjustment.

9. A power saw of the reciprocating blade type comprising a work supporting surface, a fin extending upwardly therefrom, means free of any part extending above said work supporting surface for supporting said fin, said fin supporting means being the sole support of any kind for said fin and said fin being of a thickness less than the width of a kerf to be formed in a workpiece by the saw, a guideway supported above said work supporting surface solely by said fin and adapted to guide the upper end of a saw blade, means below said work supporting surface for supporting the lower end of the saw blade, said saw blade being adapted to pass through the work supporting surface, and means for moving the blade supporting means in a vertical plane to impart a cutting motion to the saw blade, whereby a workpiece of unlimited lateral extent in any direction may be cut by said saw, said fin having a forward vertically disposed edge adapted to extend in a vertical direction in close proximity to the path of travel of the rear edge of a saw blade whereby said forward edge of the fin acts as a backup for the saw blade during operation of the saw.

10. A power saw according to claim 9 which includes a conventional hack saw blade, in which the guideway is adapted to limit movement of the upper portion of said blade to a vertical straight line direction, and which includes guide means for the supporting means for the lower end of the blade which limits movement thereof and therefore movement of the lower end of the blade to a vertical straight line direction.

11. For use in a power saw of the reciprocating blade type including a work supporting surface, the combination of a fin adapted to be supported solely by and extend vertically from said work supporting surface, said fin having a thickness less than the width of a kerf to be formed in a workpiece by the saw, a guideway adapted to lie above said work surface to receive and guide the upper end of a saw blade mounted in the saw, said guideway being supported on and solely by said fin, and blade guard and work hold-down means adjustably mounted on and supported solely by said fin substantially to surround said saw blade.

References Cited in the file of this patent

UNITED STATES PATENTS

| | | |
|---|---|---|
| 12,679 | Hutchinson | Apr. 10, 1855 |
| 139,426 | Scholfield | May 27, 1873 |
| 1,838,125 | Wirtz | Dec. 29, 1931 |

FOREIGN PATENTS

| | | |
|---|---|---|
| 108,981 | Switzerland | Feb. 16, 1925 |